(12) United States Patent
Yang et al.

(10) Patent No.: US 6,466,949 B2
(45) Date of Patent: Oct. 15, 2002

(54) PERFORMING EVENT NOTIFICATION IN A DATABASE HAVING A DISTRIBUTED WEB CLUSTER

(75) Inventors: Mike Yang; George Hill, both of Mountain View, CA (US)

(73) Assignee: MyWay.com Corporation, Andover, MA (US)

( * ) Notice: Subject to any disclaimer, the term of this patent is extended or adjusted under 35 U.S.C. 154(b) by 0 days.

(21) Appl. No.: 09/198,899

(22) Filed: Nov. 23, 1998

(65) Prior Publication Data

US 2002/0083030 A1 Jun. 27, 2002

(51) Int. Cl.[7] .............................................. G06F 17/30
(52) U.S. Cl. ..................... 707/201; 707/200; 707/10; 709/203
(58) Field of Search ........................ 707/10, 200, 201; 709/400, 203

(56) References Cited

U.S. PATENT DOCUMENTS

| | | | | |
|---|---|---|---|---|
| 4,972,367 A | * | 11/1990 | Burke | 707/10 |
| 5,287,453 A | * | 2/1994 | Roberts | 709/201 |
| 5,490,270 A | * | 2/1996 | Devarakonda et al. | 707/201 |
| 5,826,253 A | * | 10/1998 | Bredenberg | 707/2 |
| 5,884,325 A | * | 3/1999 | Bauer et al. | 707/201 |
| 5,926,816 A | * | 7/1999 | Bauer et al. | 707/8 |
| 5,999,947 A | * | 12/1999 | Zollinger et al. | 707/203 |
| 6,098,093 A | * | 8/2000 | Bayeh et al. | 709/203 |
| 6,381,635 B1 | * | 4/2002 | Hoyer et al. | 709/207 |

OTHER PUBLICATIONS

International Search Report PCT/US99/27848, Nov. 23, 1999.

\* cited by examiner

Primary Examiner—Greta L. Robinson
(74) Attorney, Agent, or Firm—Blakely, Sokoloff, Taylor & Zafman, LLP

(57) ABSTRACT

A method and apparatus for performing event notification in a system having a distributed web cluster. A change of state is provided to the system. A state change table is updated in the system with the provided change of state. The change of state is propagated from the state change table to the web cluster, through polling, broadcast, or other methods. The web cluster is synchronized to reflect the state change.

6 Claims, 5 Drawing Sheets

PERFORMING EVENT NOTIFICATION IN A DATABASE HAVING A DISTRIBUTED WEB CLUSTER

FIELD OF THE INVENTION

This invention relates generally to distributed computing systems, and more particularly to a method and apparatus for performing event notification in a database having a distributed web cluster.

BACKGROUND OF THE INVENTION

Modern computerized search systems can contain vast amounts of data. In order to be useful, they must return search results to a user in a reasonable amount of time. One application for computerized search systems is that of finding geographic entities such as an address, street, area, point, businesses, or list of cities that are located near a given starting point. For example, with a system containing a database of homes and businesses with corresponding addresses or geographical locations within a city, a user may want to locate banks, automated teller machines (ATMs), or restaurants which are close to a specific address or business within the city. Because the user may be waiting for the results of the search in real-time, the search results must be returned very quickly. In addition, the results should preferably be presented in an ordered format according to the usefulness to the user. For example, some businesses might have a sale or special offering which should be presented to the user before other businesses which do not have a sale or special.

To improve the access speed to information through public data networks such as the Internet, database information may be copied or "mirrored" across one or more physically distributed servers, known as web clusters. The servers may be widely separated geographically and may contain multiple independent data paths which are separated from those of other servers.

With a distributed data network having multiple data servers, there is a problem in updating and maintaining consistent information on all of the servers. For example, if new information is uploaded to one server, the information must also be distributed to and synchronized with the other mirror servers within the network. In some prior art systems, update information is broadcast to the mirror servers once a day. While this approach may be acceptable for information which does not generally change very rapidly, such as static links to web sites, it leads to server inconsistencies and unacceptable delays for time-critical information such as stock quotes or news reports.

Therefore, there is a need for a way to update time-critical information in a database having multiple servers in a distributed web cluster.

SUMMARY OF THE INVENTION

The present invention provides a method and apparatus for performing event notification in a system having a distributed web cluster. A change of state is provided to the system. A state change table is updated in the system with the provided change of state. The change of state is propagated from the state change table to the web cluster, through polling, broadcast, or other methods. The web cluster is synchronized to reflect the state change.

BRIEF DESCRIPTION OF THE DRAWINGS

The present invention is illustrated by way of example and may be better understood by referring to the following description in conjunction with the accompanying drawings, in which like references indicate similar elements and in which.

DESCRIPTION OF AN EMBODIMENT OF THE PRESENT INVENTION

In the following description of an embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention. A preferred embodiment of the present invention, described below, enables a remote computer system user to execute a software application on a network file server.

In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to facilitate description.

The present invention provides a method and apparatus for performing event notification in a system having a distributed web cluster. A change of state is provided to the system. A state change table is updated in the system with the provided change of state. The change of state is propagated from the state change table to the web cluster, through polling, broadcast, or other methods. The web cluster is synchronized to reflect the state change. Any type of message or event may be sent to the distributed web including but not limited to state information, lock out commands, additions, modifications, or deletions of information content, web pages, banner ads, or calendar events.

Figure 1:
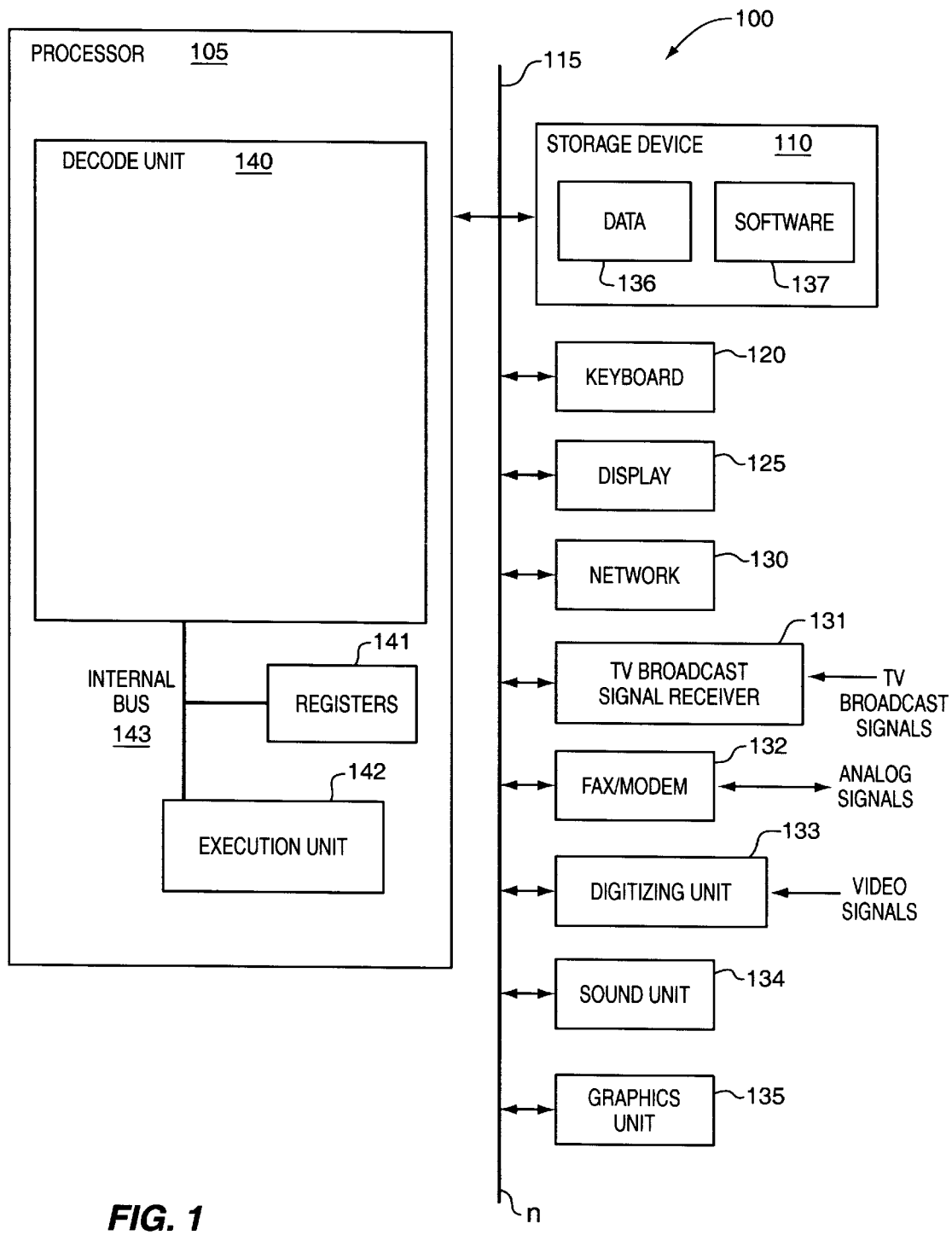
FIG. 1 is a system diagram which shows a computer hardware environment compatible with the present invention.

FIG. 1 illustrates one embodiment of a computer system 100 which implements the principles of the present invention. Computer system 100 comprises a processor 105, a storage device 110, and a bus 115. The processor 105 is coupled to the storage device 110 by the bus 115. In addition, a number of user input/output devices, such as a keyboard 120 and a display 125, are also coupled to the bus 115. The processor 105 represents a central processing unit of any type of architecture, such as CISC, RISC, VLIW, or hybrid architecture. In addition, the processor 105 could be implemented on one or more chips. The storage device 110 represents one or more mechanisms for storing data. For example, the storage device 110 may include read only memory (ROM), random access memory (RAM), magnetic disk storage mediums, optical storage mediums, flash memory devices, and/or other machine-readable mediums. The bus 115 represents one or more buses (e.g., AGP, PCI, ISA, X-Bus, VESA, etc.) and bridges (also termed as bus controllers). While this embodiment is described in relation to a single processor computer system, the invention could be implemented in a multi-processor computer system.

In addition to other devices, one or more of a network 130, a TV broadcast signal receiver 131, a fax/modem 132, a digitizing unit 133, a sound unit 134, and a graphics unit 135 may optionally be coupled to bus 115. The network 130 and fax modem 132 represent one or more network connections for transmitting data over a machine readable media (e.g., carrier waves). The digitizing unit 133 represents one or more devices for digitizing images (i.e., a scanner, camera, etc.). The sound unit 134 represents one or more devices for inputting and/or outputting sound (e.g., microphones, speakers, magnetic storage devices, optical storage devices, etc.). The graphics unit 135 represents one or more devices for generating 3-D images (e.g., graphics card).

FIG. 1 also illustrates that the storage device 110 has stored therein data 136 and software 137. Data 136 represents data stored in one or more of the formats described herein. Software 137 represents the necessary code for performing any and/or all of the techniques described with reference to FIGS. 3–6. It will be recognized by one of ordinary skill in the art that the storage device 110 preferably contains additional software (not shown), which is not necessary to understanding the invention.

FIG. 1 additionally illustrates that the processor 105 includes decode unit 140, a set of registers 141, and execution unit 142, and an internal bus 143 for executing instructions. It will be recognized by one of ordinary skill in the art that the processor 105 contains additional circuitry, which is not necessary to understanding the invention. The decode unit 140, registers 141 and execution unit 142 are coupled together by internal bus 143. The decode unit 140 is used for decoding instructions received by processor 105 into control signals and/or microcode entry points. In response to these control signals and/or microcode entry points, the execution unit 142 performs the appropriate operations. The decode unit 140 may be implemented using any number of different mechanisms (e.g., a look-up table, a hardware implementation, a PLA, etc.). While the decoding of the various instructions is represented herein by a series of if/then statements, it is understood that the execution of an instruction does not require a serial processing of these if/then statements. Rather, any mechanism for logically performing this if/then processing is considered to be within the scope of the implementation of the invention.

The registers 141 represent a storage are on processor 105 for storing information, including control/status information, integer data, floating point data, and packed data. It will be understood by one of ordinary skill in the art that one aspect of the invention is the described instruction set for operating on packed data. According to this aspect of the invention, the storage area used for storing the packed data is not critical. The term data processing system is used herein to refer to any machine for processing data, including the computer systems(s) described with reference to FIG. 1.

Figure 2:
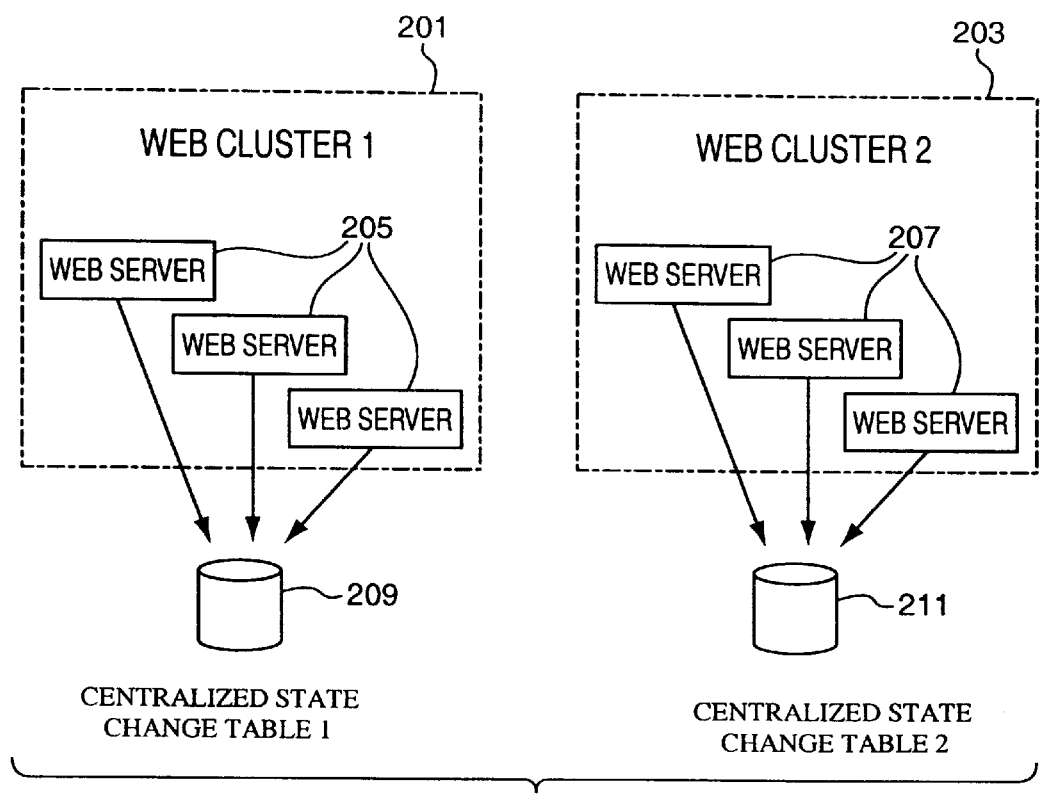
FIG. 2 is a system diagram which shows a distributed web cluster environment compatible with the present invention.

As shown in FIG. 2, the present invention is compatible with a distributed database including one or more web clusters. Multiple web clusters 201, 203 may each contain multiple web servers 205, 207. Each of the web servers 205, 207 have access to a centralized state change table 209, 211. The state change table 209, 211 is used to synchronize the web servers 205, 207 with each other and with those within each of the web clusters 201, 203. In one embodiment of the present invention, the web servers 205, 207 determine that there is a new event or change of state by periodically polling the state change table 209, 211. It will be recognized by one of ordinary skill in the art that methods of determining a new event or change of state other than polling are compatible with the present invention, such as checking the state change table for a new event each time a request for information is performed by the web server 205, 209, or sending an event notification trigger message from the state change table 209, 211 to the web server 205, 209 each time a new event is added to the state change table 209, 211.

Figure 3:
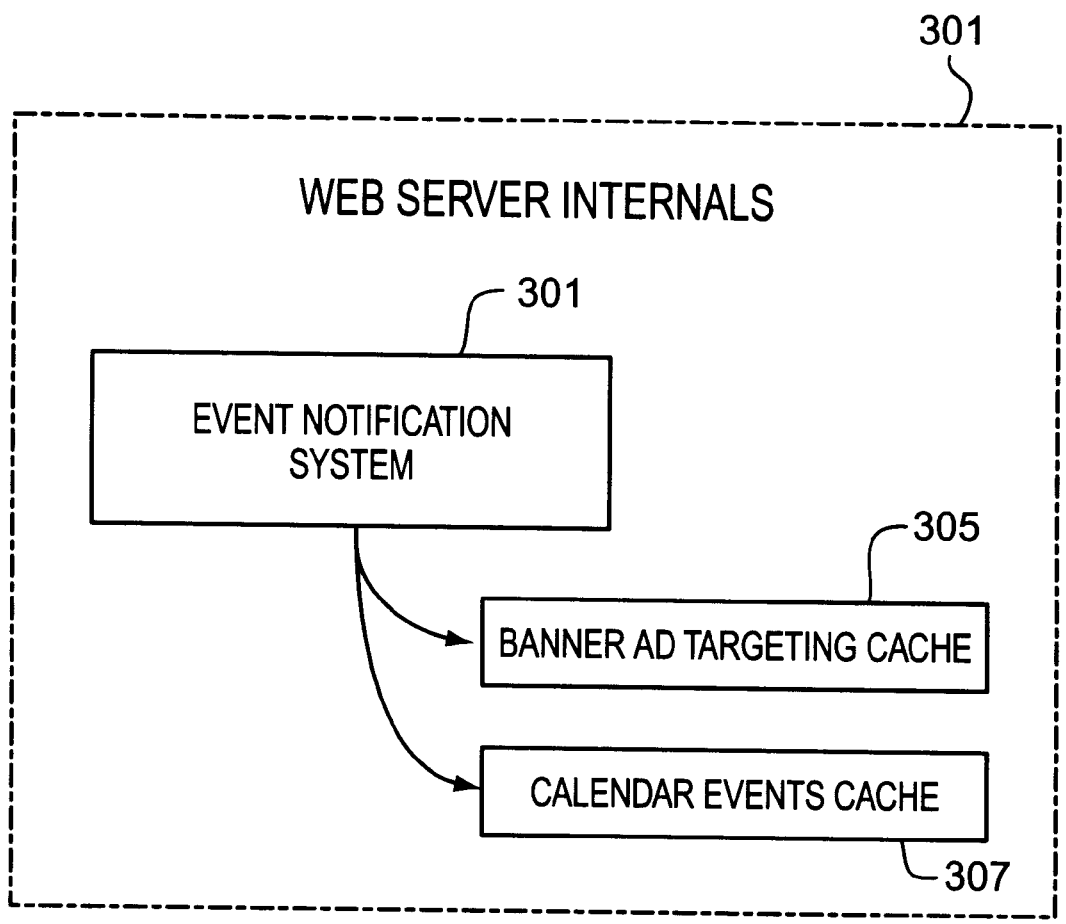
FIG. 3 is an internal diagram of a web server compatible with the present invention.

As shown in FIG. 3, a web server 301 typically implements a memory cache to hold the most frequently accessed information in memory. This allows the web server 301 to more quickly retrieve the information than if it was stored on a fixed storage device such as a hard disk drive or CD ROM drive. However, when an update is made to the information within the database contained on the fixed storage device, the web server 301 must flush the information contained in the memory cache in order eliminate possible inconsistencies between memory and disk. Without first flushing the cache, any update to the information within the database will not be visible when external requests for information are made by users and other servers. In one embodiment of the present invention, separate memory caches are used for banner ads 305 and calendar events 307. When information such as a banner ad or a page content item is modified or added through the event notification system 303, each production web server 301 automatically flushes its banner ad memory cache 305 or calendar events cache 307 accordingly. It will be recognized by one of ordinary skill in the art that many other well-known memory cache structures, such as a single set associative cache or other multiple caches implementing any one of a number of cache algorithms such as a least recently used (LRU) algorithm, may be used with the present invention without loss of generality.

Figure 4:
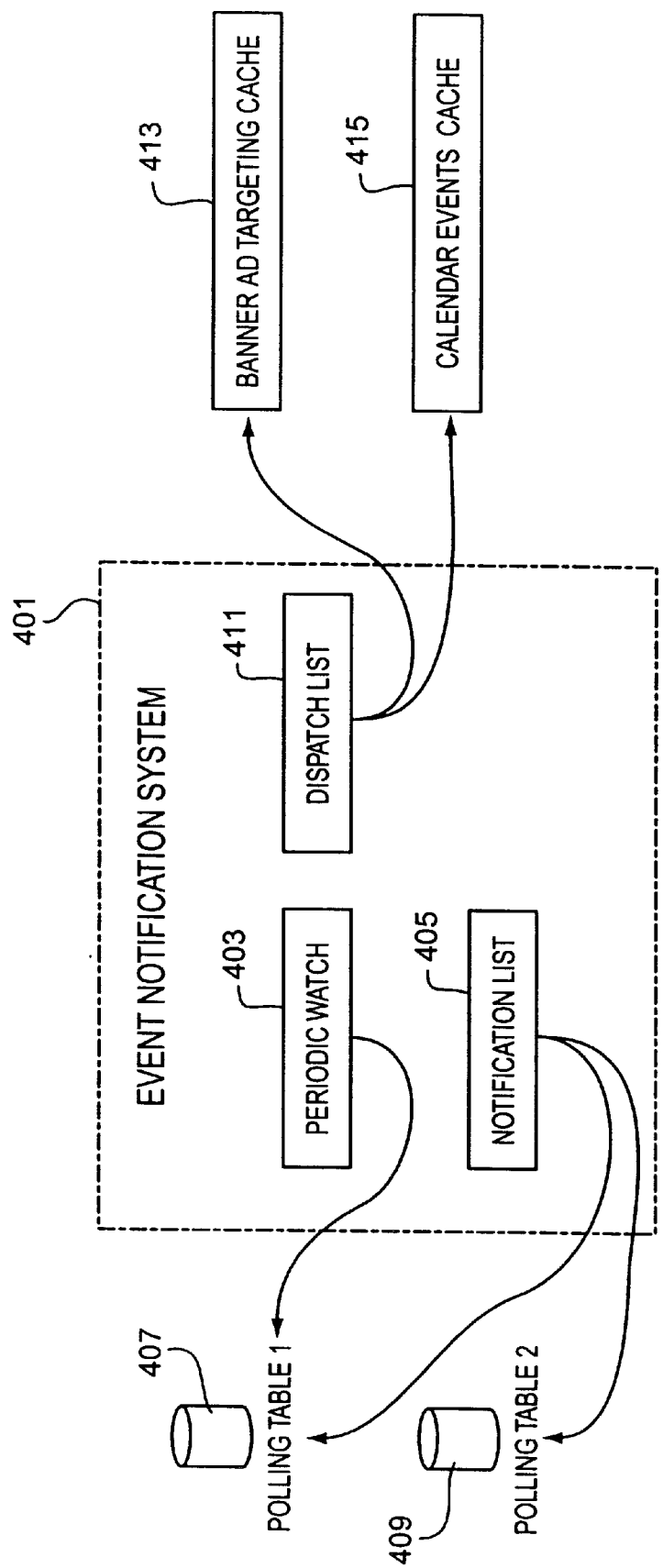
FIG. 4 is an internal diagram of an event notification system compatible with the present invention.

FIG. 4 describes an event notification structure compatible with the present invention. An event notification system 401 preferably implements a periodic watch module 403, a notification list 405, and a dispatch list 411. The watch module 403 monitors the state change table 407, 409 to determine any change in state or any new notification message. The notification list 405 records notification events in state change table 407, 409. The dispatch list 411 is used for transmitting and synchronizing banner ads through the banner ad memory cache 413 or the calendar events cache 415 accordingly.

In one embodiment of the present invention, the state change table 209, 211, 407, 409 is updated as described below.

1. Set up a configuration file for each application which points to an eventnotify table.
2. Create the eventnotify table on a database server.

In one embodiment of the present invention, an example configuration file may contain the following information:

Event notification (e.g. page content flush, banner ad flush). By using SQLServerName for EventNotifyServerName,
   # we automatically use development\production values without requiring an explicit local.txt entry.
   !EventNotifyServerName: XXSQLSERVERNAMEXX
   !EventNotifyName: abi
   !EventNotifyTable: abi.eventnotify In one embodiment of the present invention, an example core configuration file may contain the following information:

Event notification (e.g. page content flush, banner ad flush), also requires setting of
EventNotifyServerName, EventNotifyName, and EventNotifyTable.
To disable event notification, set EventNotifyPollingInterval to zero
or unset any of the other event notify settings.
!EventNotifyPollingInterval: 1

In the above example, the polling interval is set to one minute. It will be recognized that it is also possible to eliminate polling through the use of database triggers. The application program interface (API), described below, can remain the same even if polling is eliminated in the Core implementation.

In one embodiment of the present invention, event notification without polling may be implemented as described below:

\\ Generic, application-generated event notification virtual
void eventNotify(const char*name, const char*argument);

This method may be called whenever an event happens. The name of the event is a string that defines the event, and the second argument is a modifier for the event. The set of event strings may be defined as constants in a header file.

In one embodiment of the present invention, an event is invoked as described below:

\\ Generic, application-generated event notification. Use eventNotify for this machine only,
\\ and productionNotify for all machines.
void eventNotify(const char*name, const char*argument=" ");
void productionNotify(const char*name, const char*argument=" ")

It will be recognized that eventNotify only distributes the event for the local server. It is also possible to use productionnotify, which sends the event to all servers. After a call to productionNotify, all servers will preferably act upon the event within one minute, assuming that there is load on the server and the timeout is checked after each request. For example, banner ads should be flushed whenever a banner ad is modified or added. In one embodiment of the invention, this is implemented as described below:

\\ Flush banner ads theContextApp.productionNotify (EVENT_FLUSHBANNERAD);

In the banner ad server, which may preferably be a persistent object, a flush banner event is preferably monitored using a virtual C++ method and the cache flushes in response as described below:

```
void
BannerAdMgr::eventNotify(const char*name, const char*argument)
{
  if (!strcmp(name, EVENT_FLUSHBANNERAD)) {
    flushContext( );
  }
}
```

Figure 5:
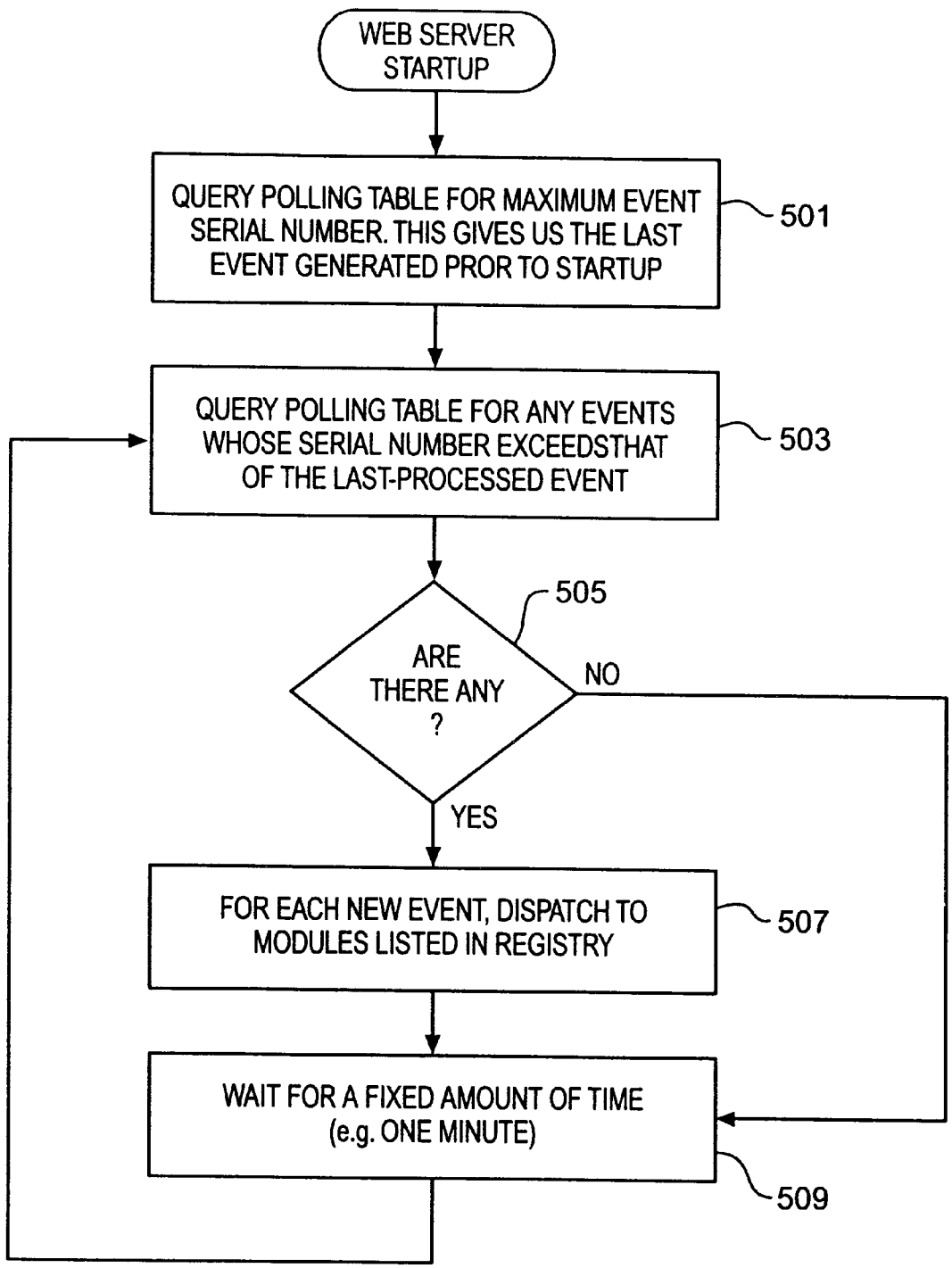
FIG. 5 is a flowchart which shows a method for performing event notification in a database having a distributed web cluster compatible with the present invention.

In one embodiment of the present invention, a method for performing event notification in a database having a distributed web cluster is shown in FIG. 5. At step 501, the event notification system queries the state change table for a maximum event serial number. This gives the last event generated prior to startup. At step 503, the state change table is queried for any events whose serial number exceeds that of the last processed event. This gives any new events since the last check. If at step 505 there are no events, control passes to step 509, where the system waits for a fixed amount of time and then returns control to step 503. Otherwise, at step 507 each new event is dispatched to modules listed in a registry and control passes to step 509.

While the invention is described in terms of preferred embodiments in a specific system environment, those of ordinary skill in the art will recognize that the invention can be practiced, with modification, in other and different hardware and software environments within the spirit and scope of the appended claims.

What is claimed is:

1. A method comprising:
   providing a first change to a first set of data of a first server;
   accessing a table from the first server;
   recording the first change in the table;
   monitoring the table to determine a second change to a second set of data of a second physically distributed server;
   providing the second change to the second set of data of the second physically distributed server, wherein providing includes providing the second change to the second set of data of a second physically distributed server belonging to a second web cluster that does not contain the first server;
   accessing the table from the second server, wherein accessing includes accessing the table from the second server belonging to the second web cluster; and
   recording the second change in the table, wherein recording includes recording the second change to the second set of data of the second server belonging to the second web cluster in the table.

2. The method of claim 1, further comprising:
   accessing a second table from the second server;
   recording the second change in the second table; and
   monitoring the second table to determine a change to data of a server not included in the second web cluster.

3. A machine-readable medium having stored thereon data representing sequences of instructions that when executed cause a machine to:
   provide a first change to a first set of data of a first server;
   access a table from the first server;
   record the first change in the table;
   monitor the table to determine a second change to a second set of data of a second physically distributed server;
   provide the second change to the second set of data of the second physically distributed server, wherein the instructions to provide further comprise instructions causing the machine to provide the second change to the second set of data of a second physically distributed server belonging to a second web cluster that does not contain the first server;
   access the table from the second server, wherein the instructions to access further comprise instructions causing the machine to access the table from the second server belonging to the second web cluster; and
   record the second change in the table, wherein the instructions to record further comprise instructions causing the machine to record the second change to the second set of data of the second server belonging to the second web cluster in the table.

4. A machine-readable medium having stored thereon data representing sequences of instructions that when executed cause a machine to:

provide a first change to a first set of data of a first server;

access a table from the first server;

record the first change in the table;

monitor the table to determine a second change to a second set of data of a second physically distributed server belonging to a second web cluster;

access a second table from the second server;

record the second change in the second table; and monitor the second table to determine a change to data of a server not included in the second web cluster.

5. A system comprising:

a first cluster of servers comprising a first server comprising a first set of data and a second server comprising a second set of data;

a second cluster of servers comprising a third server comprising a third set of data and a fourth server comprising a fourth set of data;

a first table associated with the first cluster of servers, the first table to record changes in the first cluster of servers and changes in the second cluster of servers;

a first event notification system associated with the first server to record changes in the first server in the first table, and to monitor the first table to determine changes in the second server, wherein the first event notification system associated with the first server is a first event notification system internal to the first server; and the system further comprising a third event notification system internal to the third server to record changes in the third server in a second table that records changes in the first and second cluster of servers and to monitor the second table to determine changes in the first server.

6. A system comprising:

a first cluster of servers comprising a first server comprising a first set of data and a second server comprising a second set of data;

a second cluster of servers comprising a third server comprising a third set of data and a fourth server comprising a fourth set of data;

a first table associated with the first cluster of servers, the first table to record changes in the first cluster of servers and changes in the second cluster of servers;

a first event notification system associated with the first server to record changes in the first server in the first table, and to monitor the first table to determine changes in the third server, wherein the first event notification system associated with the first server is a first event notification system internal to the first server; and the system further comprising a third event notification system internal to the third server to record changes in the third server in a second table that records changes in the first and second cluster of servers and to monitor the second table to determine changes in the first server.

* * * * *